United States Patent

[11] 3,582,923

[72] Inventors Daniel P. Peletier; Arthur F. Hogrefe, both of Silver Spring, Md.

[21] Appl. No. 774,735

[22] Filed Nov. 12, 1968

[45] Patented June 1, 1971

[73] Assignee The United States of America as represented by the Secretary of the Navy.

[54] ELECTRONIC CHARGE MONITOR

9 Claims, 2 Drawing Figs.

[52] U.S. Cl. .................... 340/204, 340/183, 340/210, 324/111

[51] Int. Cl. .................... G08c 15/12, G08c 19/28

[50] Field of Search .................... 340/203, 195, 204; 324/111

[56] References Cited

UNITED STATES PATENTS 2,970,302 1/1961 Gridley .................... 340/206

3,188,455 6/1965 Quick .................... 235/183

3,432,846 3/1969 Jones et al. .................... 340/339

*Primary Examiner*—Thomas B. Habecker

*Attorneys*—R. S. Sciascia and J. A. Cooke

ABSTRACT: The charging current supplied by a satellite solar cell array is monitored to produce a voltage signal proportional to the charging current. This voltage signal is then applied to a finite time integrator circuit whose output is, in turn, applied to a level detector. The level detector functions to clear the integrator circuit and generate an output pulse each time the integrated signal indicates that a predetermined amount of electrical charge has been supplied to the satellite battery by the solar array. The output pulses from the level detector circuit are first scaled down so that the satellite's telemetry system handles no more data than is necessary to indicate accurately the status of the satellite's power system and these scaled-down pulses are then interfaced into the satellite's telemetry system for transmission to a remote receiving station.

INVENTORS
DANIEL P. PELETIER
ARTHUR F. HOGREFE

BY J.O. Tresansky
ATTORNEY

ELECTRONIC CHARGE MONITOR

BACKGROUND OF THE INVENTION

Most earth satellites have missions which require an efficient power system aboard the satellite to supply power to the satellite-borne electronic equipment. As is well known, the typical electrical power system for a satellite includes a battery, such as of the nickel-cadmium type, and one or more solar cell arrays which convert solar energy into electrical charging energy for the battery. It is often desirable and sometimes necessary to remotely monitor the performance of the solar arrays in order to obtain information necessary for accurate and efficient evaluation of the status of the electrical power system of a satellite at any given time.

DESCRIPTION OF THE INVENTION

In view of the foregoing, it is proposed in accordance with the present invention to provide apparatus helpful in accurately evaluating the status of a satellite-borne electrical power system.

Another object of the present invention is to provide apparatus capable of accurately monitoring the charge output of one or more satellite solar cell arrays and of interfacing this data into the satellite's telemetry system for transmission to a remote receiving or monitoring station.

A further object of the present invention is to provide circuitry which: monitors the output charging current from a solar cell array and produces a pulse output each time the solar cell array has supplied a predetermined amount of charge to the satellite battery; scales down these output pulses so that the satellite's telemetry system handles no more data than is necessary for the desired monitoring accuracy; and, interfaces these scaled-down pulses into the satalite's telemetry system for transmission to a remote receiving station.

Figure 1:
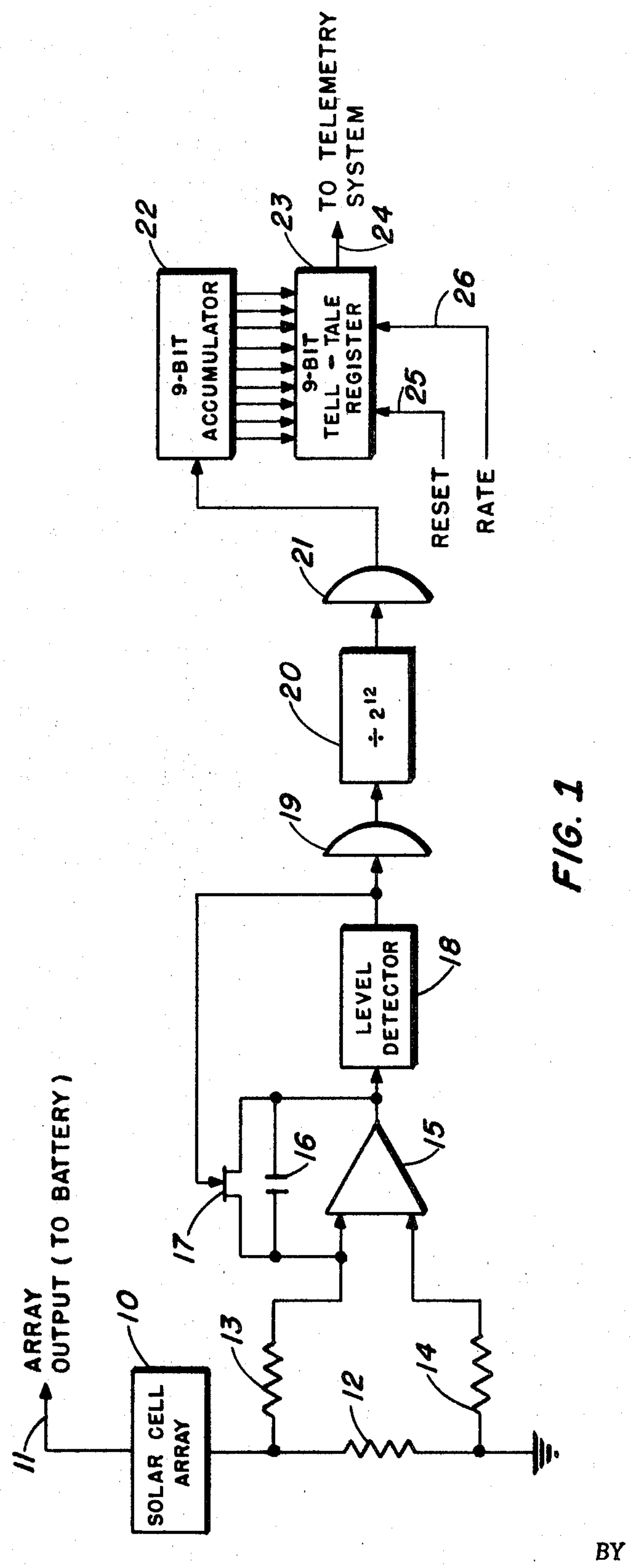
Figure 2:
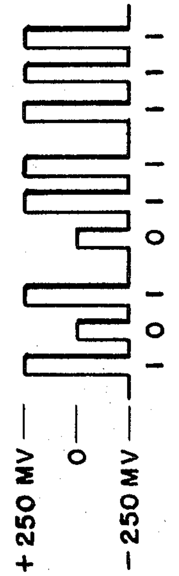

Other objects, purposes and characteristic features of the present invention will in part be pointed out as the description of the present invention progresses and in part be obvious from the accompanying drawing wherein:

FIG. 1 is a combined schematic block diagram illustrating one embodiment of the present invention; and FIG. 2 illustrates a typical output data waveform produced by the embodiment of FIG. 1.

Referring now to the drawings, the solar cell array of a typical satellite is represented at block 10 and supplies a charging current output along line 11 to a satellite-borne battery, for example. In accordance with the present invention, a monitoring resistor 12 is connected in series in this charging circuit, between the solar cell array 10 and ground. Across the monitoring resistor 12 is thus developed a voltage signal proportional to the charging current output from the solar array 10.

The analog voltage signal from resistor 12 is applied, through balancing resistors 13 and 14, as input to a conventional integrating circuit comprising operational amplifier 15 and parallel connected feedback capacitor 16. This integrator circuit combination 15–16 integrates its input voltage signal and thus produces an output proportional to the amount of charge output being supplied by the solar cell array 10. It should also be noted that the capacitor 16 is, in turn, shunted by a field effect transistor 17, for purposes to be described in detail hereinafter.

A level detector circuit 18, of conventional design, is connected to the output of the integrating operational amplifier 15 and is set to detect when the integrated value of the voltage signal across the monitoring resistor 12 has reached a predetermined level. Moreover, the output of the level detector is utilized as the gate control signal for the field effect transistor 17, such that the feedback capacitor 16 is shunted and the integrator circuit 15–16 is thus cleared each time the integrated value of the voltage signal from resistor 12 exceeds the predetermined value fixed by level detector 18. In other words, the level detector 18 causes the integrating circuit 15–16 to operate as a finite time integrator and produces a series of output pulses, each of which demarcates that the solar cell array 10 has delivered a predetermined amount of charge to the satellite battery.

These output pulses from the level detector 18 are applied, through a suitable buffer amplifier 19, to a binary divider 20 which scales down the pulses so that the satellite's telemetry system handles no more data than is necessary for the desired system accuracy. By way of example, the divider 20 might be a divide-by-$2^{12}$ device, as shown in FIG. 1. The scaled-down pulses from the divider 20 are subsequently applied, via buffer amplifier 21, to a conventional binary accumulator circuit 22 having a 9-bit capacity, for example.

The 9-bit accumulator 22 counts and stores these scaled-down pulses indicating the amount of charge supplied by the solar cell array 10 and when the accumulator 22 is full, it simply turns over and beings again. Consequently, the count received at the ground station is proportional, at modulo $2^9$, to the accumulated charge output from solar cell array 10. The 9-bit binary code output from the accumulator 22 is subsequently supplied, via a 9-bit telltale register 23 of conventional design, to line 24 connected to the satellite's telemetry system. Together, the accumulator 22 and telltale register 23 thus constitute an interface between the sealed-down pulses from the finite time integrator circuitry and the satellite's telemetry system. Reset and rate control for the telltale register 23 are also provided at lines 25 and 26 respectively, in FIG 1. In this regard, moreover, the 9-bit capacity of accumulator 22 is selected to be large enough to provide the desired 1 percent monitoring accuracy and also to obviate the necessity of resetting the telltale register 23 more than once within any 24-hour period, for example.

A typical output code from the telltale register 23 to the telemetry system is illustrated in FIG. 2 of the drawings. More specifically, it has been assumed, for illustration, that the existing accumulator code is 10101111. In the typical waveform of FIG. 2, a binary one is, for example, represented by a pulse excursion extending from minus 250 millivolts to plus 250 millivolts; whereas, a binary zero is represented by an excursion form minus 250 millivolts to zero volts.

In the illustrated embodiment of FIG. 1, only a single solar cell array and its associated monitoring circuitry has been shown. It should be understood at this time, however, that a satellite might very well be provided with more than one solar cell array. If that is the case, in practice, each of the arrays would be monitored with circuit apparatus such as that illustrated in FIG. 1 and the binary code output from the associated accumulators would be multiplexed into the telemetry system.

Many modifications, adaptations and alterations of the present invention are, of course, possible in the light of the above teachings. It is therefore to be understood that within the scope of the appended claims, the invention may be practiced otherwise than as specifically described.

What we claim is:

1. In combination with a telemetry system, apparatus for monitoring the electrical power system of a satellite including a battery and source means for supplying charging current to said battery, said monitoring apparatus comprising, means for producing a signal proportional to said charging current, finite time integrator means responsive to said proportionate signal for integrating said single to produce an output pulse demarcating each time said charging source means has supplied a predetermined amount of electrical charge to said battery, and means for applying the output pulses form said integrator means to said telemetry system for transmission to a receiving station.

2. The apparatus specified in claim 1 wherein, said source means is a solar cell array, and said proportionate signal producing means is a resistor connected serially in the charging circuit of said solar cell array to produce a voltage signal proportional to the charging current supplied by said solar cell array to said satellite battery.

3. The apparatus specified in claim 1 wherein said finite time integrator means includes, an operational amplifier operably connected to receive said proportionate signal as input, a feedback capacitor connected between the input and output of a operational amplifier to form an integrator circuit, switching means connected in circuit multiple with said feedback capacitor, and level detector means connected to the output of said operational amplifier effective to operate said switch means and discharge said feedback capacitor each time the output of said integrator circuit exceeds a predetermined value indicating that said source means has delivered a predetermined amount of electrical charge to said battery.

4. The apparatus specified in claim 3 wherein, said switching means is a field effect transistor having its source and drain terminals connected across said feedback capacitor, and said level detector means supplies a triggering signal to the gate terminal of said field effect transistor each time the output of said integrator circuit exceeds said predetermined value.

5. The apparatus specified in claim 1 wherein said pulse applying means includes means for scaling down the output pulses from said finite time integrator means to a minimum data rate compatible with the desired monitoring accuracy.

6. The apparatus specified in claim 5 wherein said scaling down means is a binary divider means operably connected to receive the output pulses form said finite time integrator means.

7. The apparatus as specified in claim 5 and further including means for interfacing the output of said scaling down means with said satellite telemetry system.

8. The apparatus specified in claim 7 wherein said interface means comprises, a multiple-bit binary accumulator operably connected to receive and store the scaled-down pulses from said scaling down means as a binary code, and a telltale register operably connected to receive the stored binary code from said accumulator and apply it to said telemetry system.

9. The apparatus specified in claim 8 wherein said accumulator is of the type which begins counting anew after it reaches a full condition.